No. 779,770. PATENTED JAN. 10, 1905.
J. H. CURRY.
FASTENER FOR GLASS PLATES IN STORE FRONTS AND SHOW CASES.
APPLICATION FILED APR. 9, 1904.
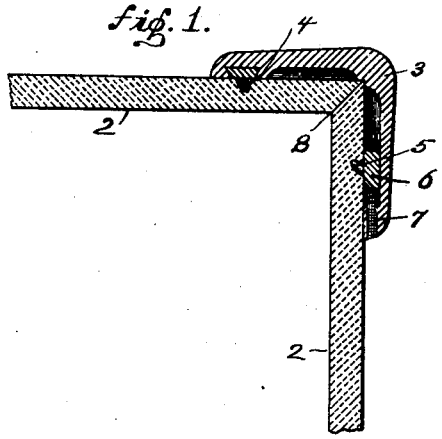
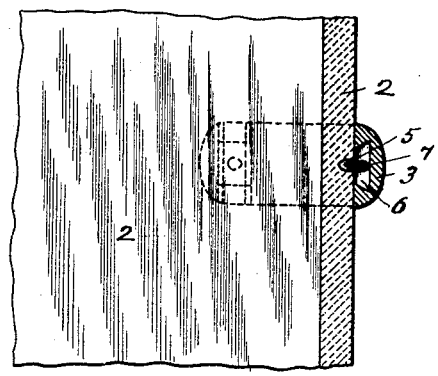
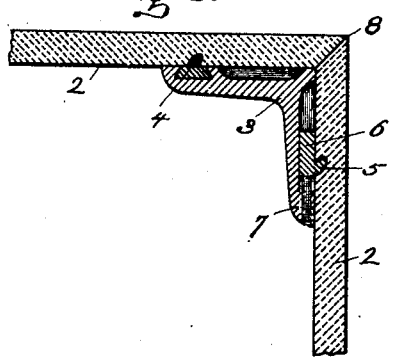
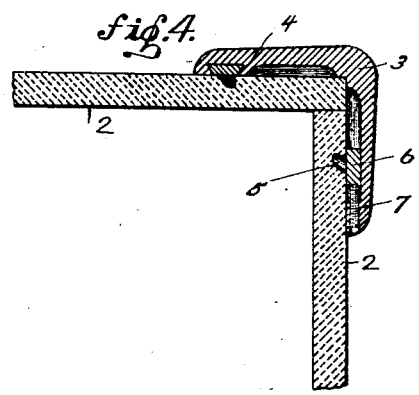
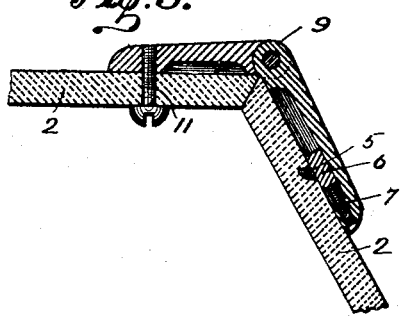
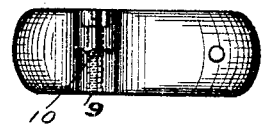
WITNESSES:
INVENTOR:

No. 779,770. Patented January 10, 1905.

UNITED STATES PATENT OFFICE.

JAMES H. CURRY, OF WILKINSBURG, PENNSYLVANIA.

FASTENER FOR GLASS PLATES IN STORE-FRONTS AND SHOW-CASES.

SPECIFICATION forming part of Letters Patent No. 779,770, dated January 10, 1905.

Application filed April 9, 1904. Serial No. 202,360.

*To all whom it may concern:*

Be it known that I, JAMES H. CURRY, of Wilkinsburg, in the county of Allegheny and State of Pennsylvania, have invented a new and useful Improvement in Fasteners for Glass Plates in Store-Fronts and Show-Cases, of which the following is a full, clear, and exact description, reference being had to the accompanying drawings, forming part of this specification, in which—

Figure 1 is a horizontal sectional view of my improved fastener as applied to the plates of glass. Fig. 2 is a vertical sectional view of the same. Fig. 3 is a horizontal sectional view of a modification. Fig. 4 is a horizontal sectional view of the fastener applied to two plates of glass having a butt-joint. Fig. 5 is a horizontal sectional view of a modification. Fig. 6 is a detached elevation of this modified fastener, and Fig. 7 is a plan view of a portion of the same.

Like symbols of reference indicate like parts wherever they occur.

My invention relates to an improvement in devices for securing plates of glass to each other, and it is especially adapted for use in show-windows and show-cases.

It consists of a fastener adapted to clamp the plates of glass at any desired angle to each other and in such manner that they shall be firmly held, forming a perfect joint.

I will now describe my invention so that others skilled in the art may manufacture and use the same.

In the drawings, 2 2 represent the two plates of glass which it is desired to connect one with the other. The meeting edges of these plates may be beveled, as shown in Figs. 2, 3, and 5, or the plates may be united by a butt-joint without the bevel, as shown in Fig. 4. The fastener itself is composed of a corner-piece 3, formed of brass, aluminium, or other suitable material, the leaves of which corner-piece extend from each other at the angle the two plates of glass are to occupy. On the inner faces of this corner-piece 3 are two projecting lugs 4 5, the lug 4 being stationary and fitting in the leaf of the corner-piece by a dovetailed joint, while the lug 5 projects from the sliding block 6, which fits in a cavity in the inner face of the corner-piece and is movable or adjustable by means of a set-screw 7, which passes through a threaded cavity in the body of the corner-piece. These lugs 4 and 5 are set at an angle toward each other less than a right angle, either curved, straight, or zigzag, and are adapted to fit in angular recesses or cavities formed in the faces of the two plates of glass 2. In operation the beveled edges 8 of the glass are brought against each other, the projections 4 and 5 are fitted in the cavities in the plate, and by turning the screw 7 the corner-piece is bound firmly on the plates of glass, holding the beveled edges of the same firmly together, thus making a secure and simple fastening.

In Figs. 1, 2, 4, and 5 I have shown the fastener adapted to fit on the outer faces of the plate of glass.

In Fig. 3 I have shown a modification in which the corner-piece 3 is adapted to be applied to the inner faces of the glass, the shape of the corner-piece being different, but the operation of the parts being exactly the same, as already described.

In Fig. 5 I show a corner-piece the leaves of which are hinged to each other, so that the corner-piece may be set at any desired angle in which the glass plates are to be set, and I preferably form the hinge 9 with serrations or teeth 10, so that when the leaves are adjusted to the desired angle they may be held rigidly at this angle by the serrations. In this modification it is preferable that the lug or projection 4 be omitted and a screw 11, passing through a hole in the glass and into the leaf of the corner-piece, be substituted therefor.

Although I have shown certain shapes and sizes of my improved fastener, I do not desire to limit myself thereto.

Heretofore all fasteners for plate-glass have had a bolt or piece extending through or between the plates of glass, this bolt passing from an inner to an outer corner-piece. By my improvement this objectionable feature is entirely obviated, the glass being held by a single corner-piece, which may be either on the inside or outside of the plate of glass.

Although I have described my improved fastener as adapted to be used with glass plates, I do not desire to limit myself thereto, as it may be advantageously used in connection with certain classes of cabinet-work in metal and wood where it is not desirable to dovetail the parts or to fasten them by glue, screws, or other fastening devices.

The advantages of my invention will be appreciated by those skilled in the art. The fastener is extremely simple, easily applied, and perfectly secure.

Having thus described my invention, what I claim, and desire to secure by Leters Patent, is—

1. In a fastener, a corner-piece having lugs or projections extending from the leaves of the corner-piece at an angle less than a right angle, one of which projections is adjustable.

2. In a glass-plate fastener, a corner-piece having two or more lugs adapted to engage with cavities formed in the face of the glass plate, one, or more, of which lugs extends from the leaf of the corner-piece at an angle less than a right angle and is movable and adjustable.

3. In a glass-plate fastener, a corner-piece having two or more securing-lugs adapted to fit in cavities formed in the face of the glass, one of which lugs extends from the leaf of the corner-piece at an angle less than a right angle, and an adjusting device for tightening and adjusting one of said projections.

4. In a glass-plate fastener, a corner-piece having two or more projecting lugs, extending at an angle less than a right angle from the faces of the corner-pieces, one of which lugs is adjustable, and an adjusting and tightening device.

5. In a glass-plate fastener, a corner-piece having two or more projections extending at an angle less than a right angle from the faces of said corner-piece, one of said projections being mounted in a slideway and having an adjusting and tightening screw.

6. In a glass-plate fastener, a corner-piece having hinged leaves, and having a movable projection extending from the face of the corner-piece at an angle less than a right angle and adapted to engage with a cavity in the face of the glass, and having an adjusting and tightening device.

7. In a glass-plate fastener, a corner-piece having pivoted leaves, the hinge being serrated, so as to be capable of being secured at the angle desired.

In testimony whereof I have hereunto set my hand.

JAMES H. CURRY.

Witnesses:
  A. M. STEEN,
  WALTER FAMARISS.